United States Patent [19]

Nakanishi

[11] Patent Number: 4,782,104

[45] Date of Patent: Nov. 1, 1988

[54] WATER-SOLUBLE POLYMER COMPOSITION

[75] Inventor: Yasuyuki Nakanishi, Nakama, Japan

[73] Assignee: Mitsubishi Chemical Industries Limited, Tokyo, Japan

[21] Appl. No.: 54,503

[22] Filed: May 27, 1987

[30] Foreign Application Priority Data

May 27, 1986 [JP]  Japan ................................ 61-121765

[51] Int. Cl.$^4$ ............................................... C08K 5/42
[52] U.S. Cl. .................................... 524/157; 524/173; 524/241
[58] Field of Search ..................... 524/241, 157, 173

[56] References Cited

U.S. PATENT DOCUMENTS 4,694,044  9/1987  Kiniwa ................................ 524/606

Primary Examiner—Joseph L. Schofer
Assistant Examiner—J. M. Reddick
Attorney, Agent, or Firm—Oblon, Fisher, Spivak, McClelland & Maier

[57] ABSTRACT

Disclosed herein is a water-soluble polymer composition, and more in detail, a composition of a polymer or a copolymer of acrylamide having an improved thermal stability.

7 Claims, No Drawings

WATER-SOLUBLE POLYMER COMPOSITION

BACKGROUND OF THE INVENTION

The present invention relates to a water-soluble polymer composition and more in detail relates to a water-soluble polymer composition comprising a polymer or copolymer of acrylamide and methionine or a derivative thereof.

Since a polymer and a copolymer of acrylamide are water-soluble polymer of high molecular weights, the polymer and the copolymer are generally utilized as a flocculant or an injecting agent for the enhanced oil recovery.

The polymer and the copolymer of acrylamide are usually produced by a method which comprises subjecting acrylamide (and other copolymerizable monomer) to polymerization in an aqueous medium and subjecting the thus obtained aqueous gel material to hot-air drying. However, the above known method has a defect that the thermal deterioration of the polymer or the copolymer is caused in the step of hot-air drying and the molecular weight of the thus dried polymer or copolymer is reduced as compared to that before drying.

Further, in the case of using as the injecting agent for the enhanced oil recovery, such a thermally unstable polymer or copolymer suffers from the defect that the viscosity of the aqueous solution of the polymer or the copolymer is reduced by the thermal deterioration of the polymer or the copolymer because a viscous and dilute aqueous solution of the polymer or the copolymer is injected into the ground under a high pressure and the temperature of the thus injected solution is raised by terrestrial heat.

These defects of the polymer and the copolymer of acrylamide are caused by the liability thereof to be deteriorated by heat, and although various kind of thermal stabilizers has been hitherto proposed to remove the defects, any sufficient thermal stabilizer for the polymer and copolymer of acrylamide has not been proposed.

For instance, in Japanese Patent Publication No. 56-15,407(1981), the addition of a particular amino acid such as glycine, $\beta$-alanine, glutamic acid, etc. to the polymer or the copolymer for preventing the thermal deterioration thereof in the step of hot-air drying. However, it is difficult to say that the thermal deterioration is sufficiently prevented. Particularly, the polymer or the copolymer of acrylamide added with such an amino acid could not satisfy the specific properties required for the injecting agent for the enhanced oil recovery.

In U.S. Pat. No. 2,917,477, a method wherein a chelate-forming compound having an amino group and/or a carboxyl group is added to an aqueous solution of a monomer to stabilize the monomer and then the thus treated monomer is subjected to polymerization has been proposed. Further, U.S. Pat. No. 3,951,934 has proposed a method for preventing the hydrolysis of the polymer of acrylamide during the polymerization by adding a compound having an amino group. However, the polymers of acrylamide obtained according to the method of above Patents are extremely insufficient in the thermal stability for using the polymer as the injecting agent for the enhanced oil recovery.

Under these circumstances, as a result of the present inventors' studies for providing a polymer or a copolymer of acrylamide having a sufficiently improved thermal stability, it has been found by the present inventors' that the addition of methionine or a derivative thereof can remarkably improve the thermal stability of the polymer or the copolymer of acrylamide, and particularly, the thermal deterioration, in the case of using the polymer composition obtained by adding methionine or a derivative thereof to the polymer or the copolymer as the injecting agent for the enhanced oil recovery, can be remarkably prevented by such an addition. And based on the findings, the present inventors have accomplished the present invention.

SUMMARY OF THE INVENTION

In an aspect of the present invention, there is provided a water-soluble polymer composition comprising a polymer or a copolymer of acrylamide and methionine or a derivative thereof in an amount sufficient for improving the thermal stability of the polymer or the copolymer of acrylamide.

DETAILED DESCRIPTION OF THE INVENTION

In the present invention, the polymer of acrylamide is a homopolymer of acrylamide and the copolymer of acrylamide is a copolymer produced from acrylamide (major component) and other copolymerizable monomer(s). As the monomer copolymerizable with acrylamide, acrylic acid, esters and salts thereof, methacrylic acid, esters and salts thereof, acrylonitrile, methacrylamide, aminoalkyl esters and quarternary ammonium salt thereof, 2'-acrylamidepropanesulfonic acid and salts thereof, etc. may be exemplified. The molar ratio of the acrylamide unit to the copolymerizable monomer unit in the copolymer is preferably 50:50 to 97:3. A polymer obtained by partially hydrolyzing the carbamoyl group (so-called amide group: —$CONH_2$) of a homopolymer of acrylamide to the extent of 2 to 50 % with a caustic alkali such as sodium hydroxide, etc. may be also used in the present invention.

The most preferable polymer for use in the present invention is the polymer comprising

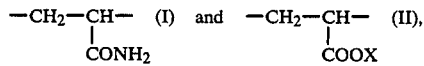

wherein X represents a hydrogen atom, an alkali metal atom or an ammonium group, and the molar ratio of unit (I) and unit (II) is, for example, 97:3 to 50:50, preferably 95:5 to 65:35.

The molecular weight of the polymer or the copolymer of acrylamide used in the present invention is preferably $1 \times 10^6$ to $2 \times 10^7$, more preferably $5 \times 10^6$ to $1 \times 10^7$.

The polymer or the copolymer of acrylamide may be produced by any of the hitherto known method. For example, the polymer or the copolymer of acrylamide is preferably produced by subjecting an aqueous 5 to 70% by weight solution of the monomer(s) to polymerization in the presence of a polymerization initiator according to the conventional method, crushing the obtained water-containing gel material of the polymer and hot-air drying after granulating. In such a method, the polymerization is usually carried out at a temperature of −10° to 100° C. for about 0.5 to 5 hours. As the polymerization initiator, for instance, peroxide such as persulfate, hydrogen peroxide, etc.; redox-initiators which are the combination of one of the peroxides mentioned above and a reducing agent such as Fe(II) salts, sulfites and water-soluble tertiary amines such as triethanolamine, triethylamine and trimethylamine; and azo-initiator such as 2,2'-azobisisobutyronitrile and 2,2'-azobis(2-amidinopropane) dihydrochloride may be exemplified. The amount of these polymerization initiator is generally 1 to 3,000 ppm with respect to the amount of the monomer(s).

In the present invention, it is indispensable that methionine or a derivative thereof is added to the polymer or the copolymer of acrylamide, and by such an addition, the thermal stability of the polymer or the copolymer of acrylamide can be improved.

In the present invention, methionine includes D-methionine, L-methionine and DL-methionine, and DL-methionine is sufficient for the purpose. The derivative of methionine includes methionine sulfoxide, methionine sulfone and hydrochloride of methionine methyl ester. Methionine or a derivative thereof may be usually added in an amount of 0.2 to 20%, preferably 1 to 10% by weight of the polymer or the copolymer of acrylamide. In the case where the amount of methionine or a derivative thereof is less than 0.2% by weight, the thermal stability cannot be improved sufficiently. On the other hand, even if methionine or a derivative thereof is used in an amount more than 20% by weight, no further improvement can be expected, therefore, such an excess use is disadvantageous.

Methionine or a derivative thereof may be usually added to the polymer or the copolymer of acrylamide at any time between the polymerization step and the hot-air drying step. Methionine or a derivative thereof may be also added to the hot-air dried polymer or copolymer of acrylamide, however, in this case, the deterioration in the hot-air drying is not prevented. Therefore, it is more preferable to add methionine or a derivative thereof to the obtained polymer or copolymer before subjecting the polymer or the copolymer to hot-air drying, because the thermal deterioration of the polymer or the copolymer can be effectively prevented.

Methionine or a derivative thereof can be added as a powder or an aqueous solution.

The particle diameter of the water-soluble polymer composition according to the present invention is preferably 0.5 to 5 mm.

The particle diameter of the water soluble powdered composition obtained upon drying ranges from 0.05 to 2 mm.

In the water-soluble polymer composition according to the present invention, which is obtained by adding a small amount of methionine or a derivative thereof to the polymer or the copolymer of acrylamide, the thermal deterioration is rarely found and the thermal stability of the polymer or the copolymer is remarkably improved. Accordingly, the water-soluble polymer composition according to the present invention can exert its beneficial effect when used, especially, as the injecting agent for the enhanced oil recovery, because the reduction of the viscosity of the aqueous solution of the polymer or the copolymer is very slight.

The present invention will be explained more in detail while referring to the following non-limitative Examples.

EXAMPLE 1

Into a 10 l polymerization vessel lined with a fluorocarbon resin, an aqueous 25% by weight solution of acrylamide was introduced and after subjecting the solution to purge with gaseous nitrogen at a temperature of 22° C., 3,000 ppm of 2,2'-azobis(2-amidinopropane) dihydrochloride was added to the solution. The polymerization of acrylamide was carried out for 5 hours (the highest temperature of the polymerization was 97° C.).

In the next place, the thus obtained aqueous gel material of the polymer of a molecular weight of about $7 \times 10^6$ was granulated into the granules of a mean particle diameter of 4 mm by an extruding granulator of meat-chopper-type, and after subjecting the thus formed granules of the polymer to contacting with 500 ml of an aqueous 47% by weight of sodium hydroxide (containing sodium hydroxide in such an amount that 25 mol % of the carbamoyl group in the polymer is hydrolyzed), powdery DL-methionine was added to the thus treated granular polymer in an amount shown in Table 1 and the thus formed mixture was dried for 120 min at 90° C. by hot air to obtain the polymer composition containing not more than 10% by weight of moisture. The particle diameter of the thus obtained polymer composition was 0.1~1.0 mm.

On carrying out the test for the thermal stability on the thus obtained polymer composition, the results shown in Table 1 were obtained.

EXAMPLES 2 to 5 and COMPARATIVE EXAMPLES 1 to 4

In the same manner as in Example 1, each polymer composition of the present invention was produced while changing the amount of addition of methionine (Examples 2 to 5). Further, other polymer compositions were produced without adding methionine (Comparative Example 1) or by addng an amino acid listed in Table 1 in place of methionine (Comparative Examples 2 to 7). The results of the test for the thermal stability of the polymer compositions are also shown in Table 1.

TABLE 1

| | Additive | | |
|---|---|---|---|
| No. | amino acid | amount of addition (% by weight) | Thermal stability(*) (%) |
| Example | | | |
| 1 | methionine | 0.5 | 70 |
| 2 | methionine | 1.0 | 80 |
| 3 | methionine | 3.0 | 90 |
| 4 | methionine | 6.0 | 92 |
| 5 | methionine | 9.0 | 95 |
| Comparative Example | | | |
| 1 | none | — | 10 |
| 2 | glutamic acid | 3.0 | 50 |
| 3 | alanine | 3.0 | 30 |
| 4 | glycine | 3.0 | 40 |
| 5 | cysteine | 3.0 | 5 |
| 6 | cystine | 3.0 | 5 |
| 7 | sodium aspartate | 3.0 | 50 |

Note
(*)Thermal Stability:
Each of the polymer composition was dissolved in an aqueous 3% by weight of sodium chloride solution in a concentration of 0.5% by weight and after keeping the thus prepared solution sealed in a vial in a thermostat at a temperature of 85° C. for 20 days, the viscosity of the solution was measured with a BL-type viscosimeter. The retention of the viscosity calculated according to the following equation was used as an index of the thermal stability of the polymer of acrylamide.

The retention of the viscosity (%) = $\frac{\text{viscosity after kept at 85° C.}}{\text{viscosity before kept at 85° C.}}$

What is claimed is:
1. A water-soluble thermally stable polymer composition, comprising:

(1) a water-soluble homopolymer of acrylamide or a water-soluble copolymer of acrylamide comprising units of the formula (I):

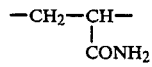  (I)

and units of the formula (II):

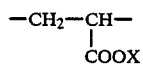  (II)

wherein X is hydrogen, alkali metal or ammonium, and (2) methionine or a derivative thereof selected from the group consisting of methionine sulfoxide, methionine sulfone and the hydrochloride of methionine methyl ester, said methionine or said derivative thereof being incorporated in the composition in an amount ranging from 0.2 to 20% by weight of the amount of said homopolymer or copolymer.

2. The water soluble polymer composition according to claim 1, wherein the molar ratio of units (I) to units (II) of said acrylamide copolymer ranges from 97:3 to 50:50.

3. The water-soluble polymer composition according to claim 1, wherein the composition is in powder form whose particles range in diameter from 0.05 to 2mm.

4. The water soluble polymer composition according to claim 2, wherein the ratio of units (I) to units (II) ranges from 95:5 to 65:35.

5. The water soluble polymer composition according to claim 1, wherein the amount of said methionine component ranges from 1 to 10% by weight of the polymer.

6. The water-soluble polymer composition according to claim 1, wherein said polymer composition is used as an injecting agent for the enhanced oil recovery.

7. The water-soluble polymer composition according to claim 1, wherein the molecular weight of said homopolymer or said copolymer of acrylamide is $1 \times 10^6$ to $2 \times 10^7$.

* * * * *